United States Patent
Wang et al.

(10) Patent No.: US 12,418,870 B1
(45) Date of Patent: Sep. 16, 2025

(54) METHOD, APPARATUS, AND DEVICE OF AUDIO PROCESSING COMBINING WiFi AND BLUETOOTH LOW ENERGY BLE TECHNOLOGIES, AND STORAGE MEDIUM

(71) Applicant: Linkplay Technology Inc., Newark, CA (US)

(72) Inventors: Huaijing Wang, Newark, CA (US); Lifeng Zhao, Newark, CA (US)

(73) Assignee: Linkplay Technology Inc.

( * ) Notice: Subject to any disclaimer, the term of this patent is extended or adjusted under 35 U.S.C. 154(b) by 0 days.

(21) Appl. No.: 19/192,438

(22) Filed: Apr. 29, 2025

(30) Foreign Application Priority Data

Dec. 13, 2024 (CN) .......................... 202411834984.3

(51) Int. Cl.
*H04J 3/06* (2006.01)
*H04W 4/80* (2018.01)
*H04W 56/00* (2009.01)

(52) U.S. Cl.
CPC ......... *H04W 56/0015* (2013.01); *H04W 4/80* (2018.02)

(58) Field of Classification Search
CPC . H04W 56/0015; H04W 4/80; H04W 56/005; H04W 56/0065; H04W 40/22; G06F 3/167; G06Q 40/04; H04R 3/12
USPC ........................................................ 370/350
See application file for complete search history.

(56) References Cited

U.S. PATENT DOCUMENTS

| | | | | |
|---|---|---|---|---|
| 9,521,449 | B2 * | 12/2016 | Kidron | H04N 21/43637 |
| 10,231,008 | B2 * | 3/2019 | Møller | G06F 3/165 |
| 10,839,795 | B2 * | 11/2020 | Torok | G10L 15/22 |
| 11,245,985 | B2 * | 2/2022 | Borowski | H04N 21/4302 |
| 11,394,480 | B2 * | 7/2022 | Bowler | H04J 3/0658 |
| 11,416,209 | B2 * | 8/2022 | Vega Zayas | H04N 21/439 |
| 11,586,413 | B2 * | 2/2023 | Mackay | H04N 21/4392 |
| 12,026,431 | B2 * | 7/2024 | Keyser-Allen | G06F 3/165 |
| 12,132,459 | B2 * | 10/2024 | McPherson | H04S 7/305 |
| 12,132,952 | B1 * | 10/2024 | Dhanapalan | H04N 21/44 |
| 12,219,332 | B1 * | 2/2025 | Wang | H04R 3/12 |
| 12,254,243 | B1 * | 3/2025 | Liu | G10L 19/22 |
| 12,277,367 | B1 * | 4/2025 | Liu | G06F 3/165 |
| 12,307,161 | B1 * | 5/2025 | Liao | G06F 3/165 |

(Continued)

FOREIGN PATENT DOCUMENTS

| | | |
|---|---|---|
| CN | 107450332 A | 12/2017 |
| CN | 115733703 A | 3/2023 |

(Continued)

*Primary Examiner* — Marceau Milord
(74) *Attorney, Agent, or Firm* — Bayramoglu Law Offices LLC

(57) ABSTRACT

A method of audio processing combining WiFi and BLE technologies includes: obtaining target audio data including multi-channel information; establishing connections among audio devices corresponding to multiple rooms through WiFi and BLE Auracast™ protocols; dynamically configuring distribution paths according to intelligent distance detection results, and obtaining a configured audio distribution network; adjusting, using a synchronization algorithm in the BLE Auracast™ protocol, a timing sequence of the target audio data, and obtaining synchronized audio data; and transmitting, according to the configured audio distribution network, the synchronized audio data via WiFi or the BLE Auracast™ protocol to each audio device for playback.

10 Claims, 6 Drawing Sheets

(56) References Cited

U.S. PATENT DOCUMENTS

| | | | |
|---|---|---|---|
| 2010/0290643 A1* | 11/2010 | Mihelich | H04S 7/301 |
| | | | 381/103 |
| 2016/0366518 A1* | 12/2016 | Strogis | H04R 3/04 |
| 2018/0020309 A1* | 1/2018 | Banerjee | G11B 20/10037 |
| 2018/0070187 A1* | 3/2018 | Drinkwater | H04R 27/00 |
| 2018/0233137 A1* | 8/2018 | Torok | G06F 3/167 |
| 2020/0117416 A1* | 4/2020 | Vega Zayas | H04N 21/43615 |
| 2020/0314539 A1* | 10/2020 | Borowski | H04N 7/142 |
| 2021/0058179 A1* | 2/2021 | Bowler | H04W 52/0216 |
| 2022/0078552 A1* | 3/2022 | Delhoume | H04N 21/43076 |
| 2022/0137918 A1* | 5/2022 | Sheen | H04R 29/001 |
| 2022/0295204 A1* | 9/2022 | Garcia | G06N 20/00 |
| 2022/0300444 A1* | 9/2022 | Pu | G06F 13/405 |

FOREIGN PATENT DOCUMENTS

| | | |
|---|---|---|
| CN | 118354325 A | 7/2024 |
| CN | 118870502 A | 10/2024 |
| JP | 2016525813 A | 8/2016 |

* cited by examiner

METHOD, APPARATUS, AND DEVICE OF AUDIO PROCESSING COMBINING WiFi AND BLUETOOTH LOW ENERGY BLE TECHNOLOGIES, AND STORAGE MEDIUM

CROSS REFERENCE TO THE RELATED APPLICATIONS

This application is based upon and claims priority to Chinese Patent Application No. 202411834984.3, filed on Dec. 13, 2024, the entire contents of which are incorporated herein by reference.

TECHNICAL FIELD

This application relates to the field of audio processing technologies, in particular to a method of audio processing combining wireless fidelity (WiFi) and bluetooth low energy (BLE) technologies, an apparatus of audio processing combining WiFi and BLE technologies, and a device of audio processing combining WiFi and BLE technologies, and a storage medium.

BACKGROUND

Currently, multi-room audio systems on the market either rely entirely on WiFi networks or use only BLE technology, and this single transmission mode has notable drawbacks. Specifically, due to the transmission characteristics of WiFi networks, especially in complex network environments, audio data between different rooms may experience varying delays during transmission. This can cause users to perceive a lack of synchronization between audio channels while listening, affecting the overall coherence and immersive quality of the sound. On the other hand, BLE has relatively weak transmission range and wall-penetration capabilities, which becomes particularly noticeable in large residences or environments with complex room layouts. When the users attempt to play audio in a room far from a source of a BLE signal, they may encounter unstable signals or connection dropouts, thereby limiting the widespread application of BLE technology in multi-room audio systems.

Therefore, either the WiFi network scheme or BLE technology, each has its own drawbacks, namely, there is high delay in multi-channel synchronization of the WiFi network scheme, while the BLE scheme suffers from limited transmission range.

SUMMARY

In a first aspect, this application provides a method of audio processing combining Wireless Fidelity WiFi and Bluetooth Low Energy BLE technologies, including:
  obtaining target audio data including multi-channel information;
  establishing, using WiFi technology and combining with a BLE Auracast™ protocol, intelligent hybrid transmission architecture connections among audio devices corresponding to a plurality of rooms;
  dynamically configuring distribution paths of the target audio data according to intelligent distance detection results, and obtaining a configured audio distribution network;
  adjusting, using a synchronization algorithm in the BLE Auracast™ protocol, a timing sequence of the target audio data, and obtaining synchronized audio data; and
  transmitting, according to the configured audio distribution network, the synchronized audio data via WiFi or the BLE Auracast™ protocol to a corresponding channel of each audio device for playback.

In one possible embodiment, obtaining the target audio data including multi-channel information, includes: receiving original audio data, where the original audio data includes information of at least two channels;
  analyzing the original audio data, identifying and separating data of each channel; and
  pre-processing, according to a preset audio processing rule, the separated data of each channel, and obtaining the target audio data including multi-channel information.

In one possible embodiment, establishing using the WiFi technology and combining with the BLE Auracast™ protocol the intelligent hybrid transmission architecture connections among the audio devices corresponding to the plurality of rooms, includes:
  buffering, using the WiFi technology, the target audio data including the multi-channel information;
  activating a BLE broadcast function and setting a corresponding broadcast parameter through the BLE Auracast™ protocol; and
  scanning, using BLE technology, the audio devices of rooms, identifying a BLE identifier of each audio device to establish a communication connection, and forming the intelligent hybrid transmission architecture connections.

In one possible embodiment, dynamically configuring distribution paths of the target audio data according to the intelligent distance detection results and obtaining the configured audio distribution network, includes:
  monitoring in real time a relative distance between each audio device and a WiFi access point, and obtaining distance information;
  grouping all audio devices according to the distance information; and
  configuring a corresponding transmission manner for each audio device based on a grouping result, determining the distribution paths of the target audio data and obtaining the configured audio distribution network.

In one possible embodiment, grouping all audio devices according to the distance information includes:
  comparing the relative distance of each audio device from the WiFi access point with a preset grouping threshold; and
  categorizing, according to comparison results, all audio devices into a WiFi transmission group and a BLE Auracast™ protocol transmission group.

In one possible embodiment, configuring the corresponding transmission manner for each audio device based on the grouping result, determining the distribution paths of the target audio data and obtaining the configured audio distribution network, includes:
  configuring the corresponding transmission manner for each audio device based on the grouping result;
  determining the distribution paths of the target audio data based on a transmission manner configuration result in combination with layout of each room, performance of each audio device and a quantity of channels of the target audio data; and
  setting a role of each audio device in the audio distribution network based on the determined distribution paths, and verifying whether a configuration is successful, and obtaining the configured audio distribution network.

In one possible embodiment, adjusting the timing sequence of the target audio data using the synchronization algorithm in the BLE Auracast™ protocol and obtaining the synchronized audio data, includes:
  identifying and obtaining a clock difference and network delay between the audio devices;
  calculating, using the synchronization algorithm in the BLE Auracast™ protocol based on the clock difference and network delay, a time compensation value of each audio device, and obtaining time compensation information; and
  performing, based on the time compensation information, time compensation on data of each channel of the target audio data, and obtaining the synchronized audio data.

In one possible embodiment, identifying and obtaining the clock difference and network delay between the audio devices includes:
  activating a clock synchronization mechanism, transmitting and receiving a clock synchronization signal via a BLE connection, measuring a signal round-trip time, and calculating the network delays between the audio devices; and
  recording, using a timestamp, time when each audio device receives the synchronization signal, and calculating the clock difference between the audio devices.

In one possible embodiment, calculating using the synchronization algorithm in an audio broadcasting technology protocol based on the clock difference and network delay a time compensation value of each audio device, and obtaining time compensation information includes:
  selecting one audio device as a primary device and remaining audio devices as secondary devices;
  calculating, based on the clock difference and network delay collected by the primary device, a time offset of each secondary device with respect to the primary device, and obtaining time offset information; and
  calculating, based on the time offset information and a playback rate of an audio data stream corresponding to each audio device, a time compensation value of each secondary device, and obtaining time compensation information.

In one possible embodiment, transmitting based on the configured audio distribution network the synchronized audio data via WiFi or the BLE Auracast™ protocol to corresponding channels of each audio device for playback, includes:
  for first audio devices in the WiFi group, transmitting the synchronized audio data according to the configured audio distribution network via WiFi, and enabling each first audio device to receive and extract audio data of each channel for playback;
  for second audio devices in the BLE Auracast™ group, packing the synchronized audio data into BLE packets compatible for BLE transmission; and
  transmitting, according to the configured audio distribution network, the BLE packets sequentially or in parallel to the second audio devices using the BLE technology, and enabling each second audio device to decode and extract audio data of each channel for playback.

In one possible embodiment, packing the synchronized audio data into the BLE packets compatible for BLE transmission includes:
  segmenting the synchronized audio data, where each data segment includes audio information of a fixed length of time; and
  adding header information to each data segment in a manner of complying with a data format and a bandwidth limitation of BLE transmission, encoding and compressing each data segment and the corresponding header information, and packing data segments as the BLE packets.

In one possible embodiment, transmitting according to the configured audio distribution network the BLE packets sequentially or in parallel to the second audio devices using the BLE technology includes:
  reading a topological structure of the configured audio distribution network;
  determining, according to the topological structure, a connection relationship and transmission sequence among the audio devices, and obtaining a target configuration of the audio distribution network; and
  selecting, according to the target configuration of the audio distribution network, a target BLE transmission strategy, and transmitting the BLE data packets sequentially or in parallel to the second audio devices.

In a second aspect, this application provides an apparatus of audio processing combining Wireless Fidelity WiFi and Bluetooth Low Energe BLE technologies, including:
  an obtaining module, configured to obtain target audio data including multi-channel information;
  an establishing module, configured to establish, using WiFi technology and combining with a BLE Auracast™ protocol, intelligent hybrid transmission architecture connections among audio devices corresponding to a plurality of rooms;
  a configuring module, configured to dynamically configure distribution paths of the target audio data according to intelligent distance detection results, and obtain a configured audio distribution network;
  an adjusting module, configured to adjust, using a synchronization algorithm in the BLE Auracast™ protocol, a timing sequence of the target audio data, and obtain synchronized audio data; and
  a playback module, configured to transmit, according to the configured audio distribution network, the synchronized audio data via WiFi or the BLE Auracast™ protocol to a corresponding channel of each audio device for playback.

In one possible embodiment, the obtaining module is specifically configured to:
  receive original audio data, where the original audio data includes information of at least two channels;
  analyze the original audio data, identify and separate data of each channel; and
  pre-process, according to a preset audio processing rule, the separated data of each channel, and obtain the target audio data including multi-channel information.

In one possible embodiment, the establishing module is specifically configured to:
  buffer, using the WiFi technology, the target audio data including the multi-channel information;
  activate a BLE broadcast function and setting a corresponding broadcast parameter through the BLE Auracast™ protocol; and
  scan, using BLE technology, the audio devices of rooms, identifying a BLE identifier of each audio device to establish a communication connection, and form the intelligent hybrid transmission architecture connections.

In one possible embodiment, the configuring module includes:

a monitoring unit, configured to monitor in real time a relative distance between each audio device and a WiFi access point, and obtain distance information;

a grouping unit, configured to group all audio devices according to the distance information; and a distribution unit, configured to configure a corresponding transmission manner for each audio device based on a grouping result, determine the distribution paths of the target audio data and obtain the configured audio distribution network.

In one possible embodiment, the grouping unit is specifically configured to:

compare the relative distance of each audio device from the WiFi access point with a preset grouping threshold; and categorize, according to comparison results, all audio devices into a WiFi transmission group and a BLE Auracast™ protocol transmission group.

In one possible embodiment, the distribution unit is specifically configured to:

configure the corresponding transmission manner for each audio device based on the grouping result;

determine the distribution paths of the target audio data based on a transmission manner configuration result in combination with layout of each room, performance of each audio device and a quantity of channels of the target audio data; and set a role of each audio device in the audio distribution network based on the determined distribution paths, and verifying whether a configuration is successful, and obtaining the configured audio distribution network.

In one possible embodiment, the adjusting module includes:

an obtaining unit, configured to identify and obtain a clock difference and network delay between the audio devices;

a calculating unit, configured to calculate, using the synchronization algorithm in the BLE Auracast™ protocol based on the clock difference and network delay, a time compensation value of each audio device, and obtain time compensation information; and a compensation unit, configured to perform, based on the time compensation information, time compensation on data of each channel of the target audio data, and obtain the synchronized audio data.

In one possible embodiment, the obtaining unit is specifically configured to:

activate a clock synchronization mechanism, transmit and receive a clock synchronization signal via a BLE connection, measure a signal round-trip time, and calculate the network delays between the audio devices; and record, using a timestamp, time when each audio device receives the synchronization signal, and calculate the clock difference between the audio devices.

In one possible embodiment, the calculating unit is specifically configured to:

select one audio device as a primary device and remaining audio devices as secondary devices;

calculate, based on the clock difference and network delay collected by the primary device, a time offset of each secondary device with respect to the primary device, and obtain time offset information; and calculate, based on the time offset information and a playback rate of an audio data stream corresponding to each audio device, a time compensation value of each secondary device, and obtain time compensation information.

In one possible embodiment, the playback module includes:

a first playback unit, configured to, for first audio devices in the WiFi group, transmit the synchronized audio data according to the configured audio distribution network via WiFi, and enable each first audio device to receive and extract audio data of each channel for playback;

a packing unit, configured to, for second audio devices in the BLE Auracast™ group, pack the synchronized audio data into BLE packets compatible for BLE transmission; and a second playback unit, configured to transmit, according to the configured audio distribution network, the BLE packets sequentially or in parallel to the second audio devices using the BLE technology, and enable each second audio device to decode and extract audio data of each channel for playback.

In one possible embodiment, the packing unit is specifically configured to:

segment the synchronized audio data, where each data segment includes audio information of a fixed length of time; and add header information to each data segment in a manner of complying with a data format and a bandwidth limitation of BLE transmission, encode and compress each data segment and the corresponding header information, and pack data segments as the BLE packets.

In one possible embodiment, the second playback unit is specifically configured to:

read a topological structure of the configured audio distribution network;

determine, according to the topological structure, a connection relationship and transmission sequence among the second audio devices, and obtain a target configuration of the audio distribution network; and select, according to the target configuration of the audio distribution network, a target BLE transmission strategy, and transmit the BLE data packets sequentially or in parallel to the second audio devices, and enable each second audio device to decode and extract audio data of each channel for playback.

In a third aspect, this application provides a device of audio processing combining WiFi and BLE technologies, including: a memory and at least one processor, where the memory has stored thereon instructions, and the at least one processor calling the instructions in the memory, enables the device to perform the above-mentioned method of audio processing combining WiFi and BLE technologies.

In a fourth aspect, this application provides a computer readable storage medium having instructions stored thereon, the instructions implementing, when executed by a processor, the above-mentioned method of audio processing combining WiFi and BLE technologies.

DETAILED DESCRIPTION OF THE EMBODIMENTS

The embodiments of this application provide a method, an apparatus, and a device of audio processing combining WiFi and BLE technologies, and a storage medium, so as to achieve high-quality, low-delay multi-room multi-channel synchronized playback.

Terms such as "first", "second", "third" and "fourth" (if any) in the description, claims and the drawings of this application are used to differentiate similar objects, and not necessarily used to describe a specific sequence or order. It should be appreciated that the data used in this way may be interchanged under an appropriate circumstance, so that the embodiments of this application described herein may be implemented in a sequence other than those illustrated or described herein. Moreover, terms "include", "have" and any other variation thereof are intended to encompass non-exclusive inclusion, such that a process, method, system, product or device including a series of steps or units includes not only those steps or elements, but also other steps or units not explicitly listed, or steps or units inherent in the process, method, system, product or device.

As can be appreciated, an entity for performing this application may be an apparatus of audio processing combining WiFi and BLE technologies, and may also be a terminal or a server, which will not be particularly defined herein. The embodiments of this application are illustrated with the server as the entity.

Figure 1:
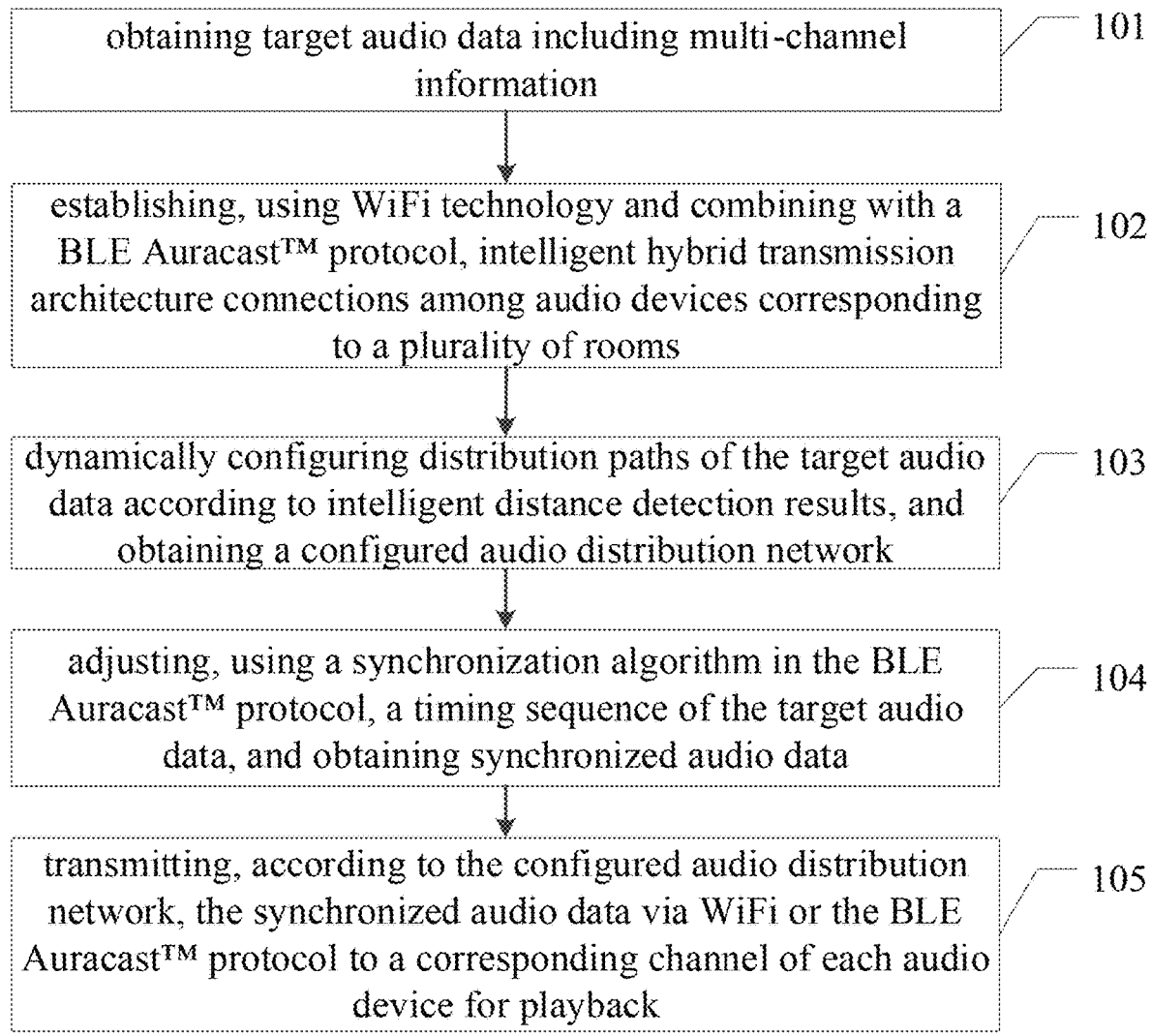
FIG. 1 is a schematic diagram of a method of audio processing combining WiFi and BLE technologies according to the embodiments of this application.

To facilitate understanding, the specific process of the embodiments of this application will be described below. Please refer to FIG. 1, the method of audio processing combining WiFi and BLE technologies according to the embodiments of this application includes the following steps.

Step 101, obtaining target audio data including multi-channel information.

For example, the audio data including multi-channel information is obtained in such a source device as a home theater system, a smartphone, or a computer, and a format of the audio data may be such advanced multi-channel audio format as Dolby AC-3, DTS-HD Master Audio, Dolby TrueHD, or Atmos. When a core controller is connected to the source device, the core controller may be a WiiM module with integrated high-efficiency audio decoding and processing capabilities. The core controller has the ability to recognize and parse multiple audio formats. Upon establishing a connection, the core controller receives these audio streams, decodes the audio data using an integrated decoder, and converts the audio data into digital audio signals recognizable by audio devices. These signals are configured for subsequent processing and distribution, so as to ensure that the multi-channel audio data can be transmitted accurately to each audio device.

Step 102, establishing, using WiFi technology and combining with a BLE Auracast™ protocol, intelligent hybrid transmission architecture connections among audio devices corresponding to a plurality of rooms.

First, initialization and configuration via a WiFi network is performed. This process involves connecting to an available WiFi network and obtaining such network settings as an IP address, a subnet mask, a gateway, as well as a unique identifier, user account information, etc., for each audio device from a server or configuration files in the network. These configuration information is critical to the stable operation of the devices in the network, and they ensure that the devices can be correctly identified and join the network. Next, a unique identifier is assigned to each audio device using the BLE Auracast™ protocol, so as to ensure accurate identification and management in a complex network environment. Based on specific requirements of a multi-channel audio configuration, a BLE connection to each device is dynamically established, and a connection management and optimization algorithm is applied, so as to reduce delay and improve the stability of data transmission. By initializing the configuration of the audio devices via WiFi, assigning the unique identifiers using the BLE Auracast™ protocol, and dynamically establishing a BLE connection and optimizing the BLE connection, intelligent hybrid transmission architecture connections among multi-room audio devices are achieved.

Step 103, dynamically configuring distribution paths of the target audio data according to intelligent distance detection results, and obtaining a configured audio distribution network.

A distance from the audio device and an audio source to a central control node is detected in real time by using a distance sensor integrated in the audio device or the environment or by using an intelligent algorithm that is capable of capturing small changes in distance and updating distance data in real time, where the distance sensor includes, but not limited to, a laser rangefinder and an ultrasonic distance sensor, and the intelligent algorithm includes, but not limited to, a location based service algorithm.

Based on the distance from each audio device to the audio source or the central control node, a corresponding transmission path is configured for each audio device to obtain the configured audio distribution network. For example, when the distance from the audio receiving device to the central control node is small, the low-power and high-efficiency BLE Auracast™ protocol is selected for transmission, so as to reduce the energy consumption of the device and prolong the battery life. When the distance is farther away or a large amount of audio data needs to be transmitted, the high-speed and large-bandwidth WiFi network is selected, so as to ensure that the audio data can be transmitted to the target device in a stable and fast manner.

In the process of dynamically configuring the transmission paths, a variety of factors may also be considered, such as network congestion, signal interference, and device compatibility. In order to ensure that audio data can be transmitted in the most efficient and stable manner, a variety of technical means may be used to optimize the transmission paths. For example, network congestion and signal interference are reduced by dynamically adjusting the network configuration and transmission parameters, where the transmission parameters include, but are not limited to, channel selection, power control, and data encoding manners. By intelligently recognizing the compatibility of the devices, it is able to ensure that the audio data can flow seamlessly across audio devices with different brands and models.

Step 104, adjusting, using a synchronization algorithm in the BLE Auracast™ protocol, a timing sequence of the target audio data, and obtaining synchronized audio data.

The timing sequence of the target audio data is precisely adjusted by using the BLE Auracast™ protocol with integrated synchronization algorithms. In this process, a time-stamping mechanism is first used to time-tag each audio data packet, so as to ensure that a timing sequence relationships of audio data packets are maintained during transmission. Next, an efficient buffering strategy and a clock synchronization mechanism are implemented, so as to effectively compensate for possible latency differences in network transmission. In addition, a playback rate may be dynamically adjusted, so as to precisely adapt the audio data streams according to the actual situation, thereby further ensuring that audio devices in multiple rooms can receive perfectly synchronized audio data streams. This method ensures consistency and coherence in audio playback, delivering users an immersive multi-room audio experience.

Step 105, transmitting, according to the configured audio distribution network, the synchronized audio data via WiFi or the BLE Auracast™ protocol to a corresponding channel of each audio device for playback.

After the configuration of the audio distribution network is completed, first, a connection state of each audio device is checked to ensure that all audio devices have been successfully connected to the network and are each in a standby state. Next, the synchronized audio data is split and packed according to a preset audio configuration scheme, and each data packet includes such key information as corresponding audio data, timestamp information, and an identifier of a target device. The timestamp is used to ensure that the timing sequence relationship of the audio data is maintained during transmission, and the identifier of the target device is used to guide the data packet to be routed to the corresponding audio device correctly.

When the data packets are ready, the transmission manner is intelligently selected according to the network environment and the distance of the device. For devices that are within WiFi coverage and require high-speed transmission, WiFi technology is used for data transmission. For devices that are close and require lower power consumption, priority is given to broadcasting using the BLE Auracast™ protocol. Both transmission manners support low-latency and high-stability data transmission, and have intelligent routing and error-correction functions, thereby to cope with complex network environments and ensure that the audio data is transmitted to the target device accurately and precisely.

Once the data packets has transmitted to the audio device, the audio device may immediately unpack and parse the data packets. The unpacking process includes extracting audio data, timestamp information, and the device identifier from the data packets, and the parsing process further processes and converts this information so that the audio device can correctly interpret and play the audio data.

After the audio data is successfully parsed, the audio device sequences and plays the audio data based on the timestamp information, so as to ensure that the audio devices in multiple rooms can receive the synchronized audio data streams and maintain consistency and coherence of audio playback.

Furthermore, a transmission and playback state of the audio data, as well as changes in the network environment, may be monitored in real time. Upon detecting any anomaly, such as network delay or a device failure, the system may immediately take corrective actions, such as adjusting transmission strategies or reallocating data packets, so as to ensure the stability and reliability of audio distribution.

Furthermore, it provides extensive user control interfaces, such as smartphone applications, allowing users to make granular adjustments and control on audio playback according to their preferences and needs. These control interfaces not only offer intuitive graphical interfaces and convenient interaction manners, but also support multiple customized settings and scene modes, delivering a more flexible and personalized audio experience.

In the embodiments of this application, target audio data including multi-channel information is obtained, and intelligent hybrid transmission architecture connections among audio devices corresponding to a plurality of rooms are established using WiFi technology and combining with a BLE Auracast™ protocol. Next, distribution paths of the target audio data are dynamically configured according to intelligent distance detection results, and a configured audio distribution network is obtained. A timing sequence of the target audio data is adjusted using a synchronization algorithm in the BLE Auracast™ protocol, and synchronized audio data is obtained. The synchronized audio data is transmitted according to the configured audio distribution network via WiFi or the BLE Auracast™ protocol to a corresponding channel of each audio device for playback. In the embodiments of this application, the high-efficiency data transmission capability of WiFi technology is utilized to overcome the insufficient operational range of BLE technology, while the synchronization algorithm of the BLE Auracast™ protocol is employed to effectively reduce delay in multi-channel audio synchronization. Thereby, high-quality, low-delay synchronous transmission of audio data between multi-room audio devices is achieved, significantly enhancing audio playback coordination and user experience.

Figure 2:
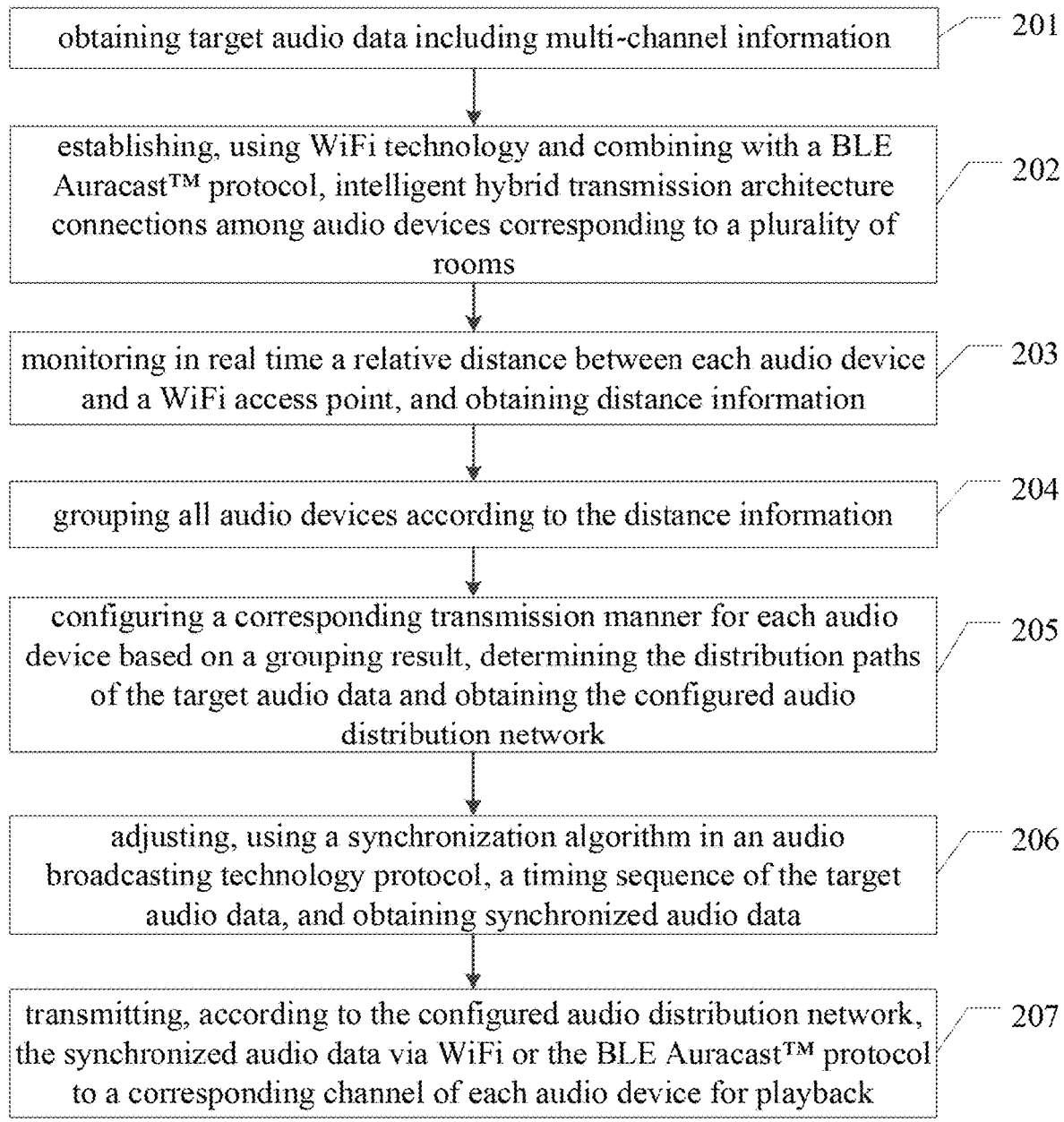
FIG. 2 is another schematic diagram of the method of audio processing combining WiFi and BLE technologies according to the embodiments of this application.

Please refer to FIG. 2, the method of audio processing combining WiFi and BLE technologies according to the embodiments of this application includes the following steps.

Step 201, obtaining target audio data including multi-channel information.

In the embodiments of this application, original audio data is received, and the original audio data includes information of at least two channels. The original audio data is analyzed, and data of each channel is identified and separated. The separated data of each channel is pre-processed according to a preset audio processing rule, and the target audio data including multi-channel information is obtained.

In the embodiments of this application, the original audio data is received, and the original audio data may be stored in a variety of formats including, but not limited to, Waveform Audio File Format WAV, Free Lossless Audio Codec FLAC, and Moving Picture Experts Group MPEG Audio Layer III MP3. Furthermore, the original audio data carries such key information as sampling rate, bit depth, and channel configuration. The audio data is captured in real-time or on-demand using a range of interfaces such as USB, Bluetooth, Wi-Fi or Ethernet. For streaming audio, audio frames may be efficiently read from a network buffer, so as to ensure data continuity and real-time performance.

According to metadata of an audio file or an audio database, the data of each channel corresponding to the original audio data is identified and separated. For the audio of a compressed format, such as MP3, decoding operations are required to convert it to an uncompressed PCM format or another uncompressed format for subsequent processing. During the parsing process, the header information of the audio file, such as a header of a WAV file, is analyzed to determine such key parameters as the quantity of channels and sampling rate.

The data of each channel separated from the original audio data is independently pre-processed according to a preset audio processing rule, the preset audio processing rule at least includes one or more of a volume adjustment rule, an equalization rule, a noise reduction processing rule, and a spatial effect processing rule. The volume adjustment rule is used to adjust a volume level of each channel, to ensure a volume balance between the channels. The equalization rule is used to adjust an audio frequency response of each channel, to improve the timbre and sound quality of the audio. The noise reduction processing rule is used to reduce a noise component in each channel, to improve the clarity of the audio. The spatial effect processing rule is used to add a spatial effect such as a reverb or a delay to each channel, so as to simulate a particular acoustic environment or to enhance the three-dimensional sense of the audio. The data of each channel that has been independently preprocessed is reassembled to generate the target audio data including the multi-channel information.

When the original audio data is received and parsed, the information of each channel is identified and separated, and then pre-processed according to the preset audio processing rule, it effectively integrates the multi-channel audio data, improves the flexibility and accuracy of audio processing, and ensures the high fidelity of the target audio data and the multi-channel playback effect.

Step 202, establishing, using WiFi technology and combining with a BLE Auracast™ protocol, intelligent hybrid transmission architecture connections among audio devices corresponding to a plurality of rooms.

In the embodiments of this application, the target audio data including the multi-channel information is buffered using the WiFi technology, and a BLE broadcast function is activated and a corresponding broadcast parameter is set through the BLE Auracast™ protocol. Next, the audio devices of rooms are scanned using BLE technology, a BLE identifier of each audio device is identified to establish a communication connection, and the intelligent hybrid transmission architecture connections are formed.

Step 203, monitoring in real time a relative distance between each audio device and a WiFi access point, and obtaining distance information.

As can be appreciated, a WiFi signal weakens with distance as it propagates. Therefore, a relative distance may be estimated by measuring a signal strength (RSSI, Received Signal Strength Indicator) received by the audio device from the WiFi access point. Specifically, a mapping relationship between signal strengths and distances may be established. During real-time monitoring, this mapping relationship is used to estimate the distance based on the received signal strength to obtain the distance information.

In another embodiment, a single WiFi access point may be not possible to provide sufficient precision to accurately measure the distance due to the fact that in a complex environment. Hence, a plurality of WiFi access points may be used to establish a positioning network. The audio device communicates with these access points and measures a relative distance to each of these access points. Next, by using the principle of triangulation and combining these distance information, a precise position of the audio device in space may be calculated, and thus the relative distance to each of the access points may be obtained to obtain the corresponding distance information.

Step 204, grouping all audio devices according to the distance information.

In the embodiments of this application, the relative distance of each audio device from the WiFi access point is compared with a preset grouping threshold, and all audio devices are categorized into a WiFi transmission group and a BLE Auracast™ protocol transmission group according to a comparison result.

According to the layout of the audio distribution network, transmission requirements and signal coverage, a grouping threshold is pre-set. The grouping threshold is used as a basis to categorize the audio devices into the WiFi transmission group and the BLE Auracast™ protocol transmission group. Specifically, when the relative distance from the audio device to the WiFi access point is less than the preset threshold, it is considered to be in the strong range of WiFi signal coverage, and is more suitable for transmitting the audio data via high-speed and stable WiFi. When the distance is greater than the threshold, the BLE Auracast™ protocol is considered to be used, which, with its low-power consumption and wide-coverage, ensures that the audio data can be transmitted stably in the weak-signal regions.

Step 205, configuring a corresponding transmission manner for each audio device based on a grouping result, determining the distribution paths of the target audio data and obtaining the configured audio distribution network.

The corresponding transmission manner for each audio device is configured based on the grouping result, and the distribution paths of the target audio data are determined based on a transmission manner configuration result in combination with layout of each room, performance of each audio device and a quantity of channels of the target audio data. Next, a role of each audio device in the audio distribution network is set based on the determined distribution paths, and whether a configuration is successful is verified, and the configured audio distribution network is obtained.

In the embodiments of this application, configuring the corresponding transmission manner for each audio device based on the grouping result includes: configuring WiFi as the transmission manner for the audio devices in the WiFi transmission group, and configuring the audio devices in the BLE Auracast™ protocol transmission group to use the BLE Auracast™ protocol for sending and receiving the audio data.

In the embodiments of this application, determining the distribution paths of the target audio data based on a transmission manner configuration result in combination with layout of each room, performance of each audio device and a quantity of channels of the target audio data includes:
  obtaining layout information of each room and analyzing performance parameters of each audio device;
  determining the quantity of channels and the content of the channels of the target audio data; and
  determining the distribution paths of the target audio data according to the layout information of each room, the performance parameters of each audio device, the quantity of channels, the content of the channels, and a result of the configuration of the transmission manner.

In the embodiments of this application, detailed layout information of each room is collected, which includes, but is not limited to, a size and shape of the room, wall and floor materials, and furniture placement. The performance parameters of each audio device are further analyzed, which include, but are not limited to, frequency response, sensitivity, and maximum output power.

In the embodiments of this application, determining the quantity of channels and the content of the channels of the target audio data may be implemented as follows. A file format of the target audio data is parsed, the channel configuration information in the audio metadata is extracted and identified, where the channel configuration information includes the quantity of channels and the identifier or role of each channel, such as a left channel, a right channel, a center channel, a surround channel. According to the parsed channel configuration information, the actual quantity of channels and the specific content of each channel of the target audio are verified and confirmed, so as to ensure the accuracy and completeness of the channel configuration information.

According to the layout information of each room, the propagation characteristics of the audio signal in the corresponding room are predicted by using acoustic simulation software or algorithms, the propagation characteristics include but are not limited to reflection, diffraction and attenuation, in order to determine the optimal transmission path of the audio signal. In combination with the performance parameters of the audio device, such as receiving sensitivity, frequency response and maximum output power, as well as the quantity of channels and channel content of the target audio data, the distribution path is optimized, so as to ensure that the data of each channel can be transmitted to the corresponding audio device with the best quality, while taking into account the physical location and connection feasibility of the device.

Acoustic simulation relies on a predicted result of software or algorithm, which may also be combined with actual acoustic measurement data to verify and adjust simulation parameters. For example, using such devices as a sound level meter and a spectrum analyzer, the actual acoustic environment in the room is measured, including such parameters as background noise, reverberation time, standing waves, etc., to ensure the accuracy of the acoustic simulation.

For the performance parameters of the audio device, in addition to focusing on the static performance indicators of the audio device, dynamic performance testing may also be performed. For example, different types of audio signals are played, the response characteristics and distortion of the audio device under different signals are observed, to comprehensively evaluate the performance of the audio device.

Taking into account the transmission manner configuration result, which includes WiFi transmission or BLE Auracast™ protocol transmission, the physical location of the audio device and the feasibility of the connection, as well as the quantity of channels and channel content of the target audio data, the distribution path is optimized and adjusted to ensure that the data of each channel may be transmitted to the corresponding audio device in the most suitable way and with the best quality.

In the embodiments of this application, setting a role of each audio device in the audio distribution network based on the determined distribution paths, and verifying whether a configuration is successful, and obtaining the configured audio distribution network includes:
assigning a specific role to each audio device based on the determined distribution paths;
constructing configuration instructions, which include device ID, role information, and connection parameters;
sending the corresponding configuration instructions to each audio device via the WiFi or BLE connection, and waiting for a confirmation response from each audio device;
checking whether each audio device has correctly received and applied the configuration instructions; and
in a case that a verification fails, resending the configuration instructions or adjusting the distribution paths until the configuration is successful to obtain the configured audio distribution network.

Based on the determined distribution paths, a specific role is assigned to each audio device, and the specific role is determined based on the function of the audio device in the audio distribution network and its physical location in the room. According to the assigned role, configuration instructions that include the device ID, role information, and connection parameters are constructed. The device ID is used to uniquely identify each audio device, the role information clarifies the responsibilities of the audio device in the audio distribution network, and the connection parameters include a channel, an address, and other necessary communication parameters for BLE or WiFi communication, ensuring that the audio device may be connected and may transmit data in a predetermined manner. Through the WiFi or BLE connection, the corresponding configuration instructions are sent to each audio device according to the determined distribution paths.

After sending the configuration instructions, the confirmation response from each audio device is monitored, the confirmation response includes the device ID and a status code, where the status code is used to indicate whether the device has successfully received and applied the configuration instructions. Checking whether each audio device has correctly received and applied the configuration instructions may be realized by parsing the status code in the confirmation response, where a status code of "Success" indicates that the configuration is successful, otherwise it indicates that the configuration has failed. In a case that the verification fails, the configuration instructions are resent to the failed audio device, the stability of the WiFi or BLE connection may be checked before resending, and reconnection is performed if necessary. In a case that the verification still fails after resending the configuration instructions, the distribution paths are adjusted according to a preset strategy, such as changing the connection order between devices, adjusting the roles of the devices, or optimizing the communication parameters, and re-configuration is performed until all audio devices are successfully configured, forming the configured audio distribution network.

When specific roles are assigned to audio devices and configuration instructions are constructed, and the configuration is sent and verified by using WiFi or BLE connection, it ensures that each device in the audio distribution network is correctly configured according to the predetermined path and parameters. This effectively enhances the accuracy and flexibility of network configuration and reduces the risk of configuration error and redundant configuration.

Step 206, adjusting, using a synchronization algorithm in an audio broadcasting technology protocol, a timing sequence of the target audio data, and obtaining synchronized audio data.

Step 207, transmitting, according to the configured audio distribution network, the synchronized audio data via WiFi or the BLE Auracast™ protocol to a corresponding channel of each audio device for playback.

In the embodiments of this application, the target audio data including multi-channel information is obtained, and the intelligent hybrid transmission architecture connections among audio devices corresponding to a plurality of rooms are established using WiFi technology and combining with a BLE Auracast™ protocol. Next, a relative distance between each audio device and a WiFi access point is monitored in real time, and distance information is obtained. All audio devices are grouped according to the distance information, a corresponding transmission manner for each audio device is configured based on a grouping result, the distribution paths of the target audio data are determined and the configured audio distribution network is obtained. A timing sequence of the target audio data is adjusted using a synchronization algorithm in the BLE Auracast™ protocol, and synchronized audio data is obtained. The synchronized audio data is transmitted according to the configured audio distribution network via WiFi or the BLE Auracast™ protocol to a corresponding channel of each audio device for playback. This embodiment establishes a hybrid transmission architecture by integrating WiFi with the BLE Auracast™ protocol, thereby to address the issues of delay of WiFi in multi-channel synchronization and the insufficient operational range of BLE. In addition, it achieves efficient and synchronous audio data distribution, delivering users a more stable, flexible, and high-quality multi-room audio playback experience.

Figure 3:
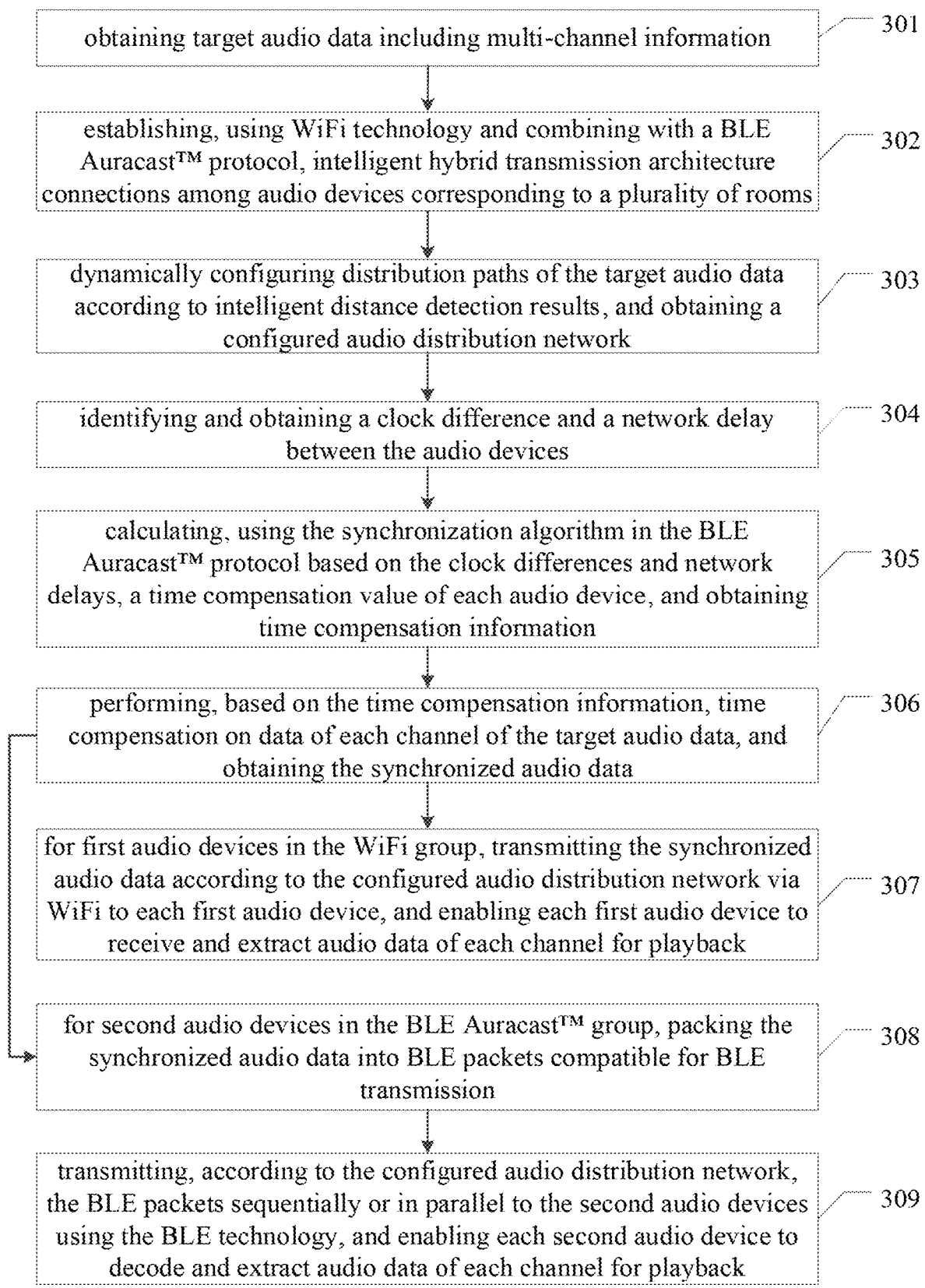
FIG. 3 is yet another schematic diagram of the method of audio processing combining WiFi and BLE technologies according to the embodiments of this application.

Please refer to FIG. 3, the method of audio processing combining WiFi and BLE technologies according to the embodiments of this application includes the following steps.

Step 301, obtaining target audio data including multi-channel information.

Step 302, establishing, using WiFi technology and combining with a BLE Auracast™ protocol, intelligent hybrid transmission architecture connections among audio devices corresponding to a plurality of rooms.

Step 303, dynamically configuring distribution paths of the target audio data according to intelligent distance detection results, and obtaining a configured audio distribution network.

Step 304, identifying and obtaining a clock difference and a network delay between the audio devices.

In the embodiments of this application, a clock synchronization mechanism is activated, a clock synchronization signal is transmitted and received via a BLE connection, a signal round-trip time is measured, and the network delay between the audio devices is calculated. Time at which each audio device receives the synchronization signal is recorded using a timestamp, and the clock difference between the audio devices is calculated.

One audio device is selected as a clock reference device, which may be a primary speaker or any other key device in the network, and the clock reference device is responsible for sending the clock synchronization signal. The clock reference device sends the clock synchronization signal to other audio devices via a BLE connection, and the clock synchronization signal includes a sending timestamp. Other audio devices, upon receiving the synchronization signal, immediately each record a receiving timestamp and send a confirmation response to the clock reference device via the BLE connection, and the response includes the receiving timestamp and a unique identifier of the device.

After the clock reference device receives the confirmation responses from each audio device, it calculates the signal round-trip time based on the sending timestamp and the receiving timestamp in the confirmation response. Due to the bidirectionality of BLE communication, half of the signal round-trip time is considered a one-way network delay from the clock reference device to the audio device. This process is repeated for all audio devices to calculate the network delay between each audio device and the clock reference device.

In one embodiment of this application, historical data may also be used to calculate the network delay of each audio device. The historical data is obtained, an historical delay average of each audio device is calculated based on the historical data, and a variance between the current measurement value of delay of each audio device and the historical delay average is calculated, a dynamic weighting coefficient is calculated based on a target variance and a preset variance threshold, and the network latency of each audio device is calculated based on the historical delay average, the current measurement value, and the dynamic weighting coefficient. Furthermore, the variance may be adjusted so as to convert an original variance value into a relative quantity that is more suitable for calculating the dynamic weighting coefficient, where the relative quantity can more accurately reflect the degree of difference between the current measurement value and the historical average value, and accordingly a weight of the current measurement value in the subsequent calculations is adjusted, so as to improve the stability and accuracy of the algorithm's estimation of the network delay.

For example, in a case that the historical delay average value DH is 5 ms, the current measurement value DC is 8 ms, and the preset variance threshold V0 is 3, the variance $\Delta V1=(DC-DH)^2=(8-5)^2=9$. A scaling ratio is determined, which may be set according to the distribution of the historical data, the needs of the application, and the desired stability level. For example, in a case that the algorithm is required to be more sensitive to larger differences, a small scaling ratio may be selected. In a case that the algorithm is required to be smoother, a large scaling ratio may be selected. This variance is adjusted based on the scaling ratio. In a case that the scaling ratio is 0.25, an adjusted variance $\Delta V2=9\times 0.25=2.25$. Next, a formula $\alpha 1=\min(e^{-\Delta V/V0}, 0.8)$ is used for calculation, $\alpha 1=e^{-2.25/3}\approx 0.47$, where $\alpha 1$ is the dynamic weighting coefficient of the current measurement value. Further, $\alpha 2=1-\alpha 1=0.53$, where $\alpha 2$ is the dynamic weighting coefficient of the historical delay average value. Last, $DN=DC*\alpha 1+DH*\alpha 2=0.47*8+0.53*5=6.41$ ms, where DN is the final calculated network delay of the audio device.

When the historical data is used to calculate the network delay of the audio device, and the difference between the current measurement value and the historical average value is adjusted in combination with the dynamic weighting coefficient, it improves the stability and accuracy of the network delay estimation, thereby more accurately reflecting the delay situation of the device.

A timestamp is used to record the time at which each audio device receives the synchronization signal, and the clock reference device also records the time at which the synchronization signal is sent, and by comparing the time at which each audio device receives the synchronization signal with the time at which the clock reference device sends the synchronization signal, a clock difference of each audio device with respect to the clock reference device is calculated.

In one embodiment, the final network delay may also be calculated based on the configured audio distribution network, the actual measured network delay, the distance between devices, and the network load condition. Specifically, a transmission type of the audio device is determined based on the configured audio distribution network, and a corresponding reference delay value is determined based on the transmission type of the audio device. The reference delay value is compared with the actual measured network delay to obtain a delay difference. A distance weight is calculated based on the distance between devices, and a network load adjustment factor is calculated based on the network load condition. Finally, the final network delay is calculated using the reference delay value, the delay difference, the distance weight, and the network load adjustment factor.

The distance weight $W(d)=1/(1+\beta*d2)$, where $\beta$ is a distance attenuation coefficient and d is the distance between devices.

The network load adjustment factor $F(n)=\log(1+\gamma*n)/\log(1+\gamma)$, where $\gamma$ is a load sensitivity with a value range of [5,20] and n is the current network load rate.

For example, a transmission type of the device is WiFi network transmission, a distance between the devices is 10 meters, and a network load rate is 60%. A reference delay value DB corresponding to the WiFi network transmission is 50 ms, and a measured delay difference $\Delta T$ is 10 ms. A corresponding weight and an adjustment factor are calculated based on the distance weight W(d) and the network load adjustment factor F(n).

In calculating the distance weight, the distance attenuation coefficient $\beta$ is set to be 0.01, and the distance between devices d is 10 meters, $W(10)=1/(1+0.01*102)=0.5$. In calculating the network load adjustment factor, the load sensitivity $\gamma$ is set to be 10, and the network load rate n is 0.6, $F(0.6)=\log(1+6)/\log(1+10)=0.72$.

A calculation is performed by using the reference delay value, the measured delay difference, the distance weight, and the network load adjustment factor, to obtain the final network delay.

The final network delay $D=DB+\Delta T*W(d)*F(n)=50+10*0.5*0.72=53.6$ ms.

By leveraging a function of the distance weight to automatically adapt to the latency characteristics at different distances, and incorporating the network load adjustment factor to dynamically respond to changes in network conditions, this multi-parameter coordinated adjustment enhances compensation accuracy and adaptability. This ensures stable delay compensation performance across diverse network environments.

In the embodiments of this application, when a clock synchronization mechanism is activated, a clock synchronization signal is transmitted and received via the BLE connection, a signal round-trip time is measured to accurately calculate the network delay. The timestamp is also used to record the reception time, so as to calculate the clock difference. This effectively achieves precise clock synchronization among devices in the audio distribution network, significantly reducing audio playback issues caused by clock desynchronization and network delay. In addition, it enhances both the accuracy and stability of synchronization audio playback, delivering users a smoother and higher-quality audio experience.

Step 305, calculating, using the synchronization algorithm in the BLE Auracast™ protocol based on the clock differences and network delays, a time compensation value of each audio device, and obtaining time compensation information.

In the embodiments of this application, one audio device is selected as a primary device and remaining audio devices are selected as secondary devices. Next, a time offset of each secondary device with respect to the primary device is calculated based on clock differences and network delays collected by the primary device, and time offset information is obtained. A time compensation value of each secondary device is calculated based on the time offset information and a playback rate of an audio data stream corresponding to each audio device, and time compensation information is obtained.

The primary device may be the audio device referred to in step 303 as the clock reference device, or it may be another audio device in the network, which will not be particularly defined herein.

Among all the audio devices, one audio device with stable performance, strong communication capability and high clock precision is selected as the primary device, which is responsible for collecting and processing the clock differences and network delays information of the other audio devices. The rest of the audio devices are set as secondary devices, which receive the synchronization signal from the primary device and make corresponding adjustments according to the instructions of the primary device. The primary device and the secondary devices communicate with each other through the BLE connection, so as to ensure real-time data transmission and reliability.

The clock difference indicates how fast or slow a local clock of the secondary device is relative to a clock of the primary device. To obtain an accurate time offset, an impact of the network delay on the clock difference needs to be considered. Specifically, the correction is performed by subtracting half of the network delay from the original clock difference. This is because network delay causes the secondary device to receive the synchronization signal later than the primary device sends the synchronization signal. By subtracting half of the network delay, a corrected clock difference is obtained, which is the time offset of the secondary device with respect to the primary device.

The primary device is selected and the time offset of each secondary device is calculated, thereby determining the time compensation value, which effectively achieves clock synchronization among the devices in the audio distribution network. This ensures a consistent playback rate of the audio data stream, reduces audio delay and distortion caused by clock desynchronization, and enhances the overall synchronization and audio quality experience.

Step 306, performing, based on the time compensation information, time compensation on data of each channel of the target audio data, and obtaining the synchronized audio data.

Based on the time compensation information, precise time adjustment is performed on each independent channel of the target audio data corresponding to each audio device in the network, including shifting a start playback point of the data of each channel forward or backward, so as to ensure that all channels of all audio devices maintain temporal consistency during playback, thereby generating the synchronized audio data.

Step 307, for first audio devices in the WiFi group, transmitting the synchronized audio data according to the configured audio distribution network via WiFi to each first audio device, and enabling each first audio device to receive and extract audio data of each channel for playback.

After the configuration of the audio distribution network is completed, for the first audio devices categorized into the WiFi transmission group, the synchronized audio data is transmitted in real-time to each first audio device via the WiFi network in accordance with the established distribution paths and configuration information. During this process, the integrity and synchronization of the audio data are ensured, allowing each first audio device to receive audio data that matches its channel configuration. When the first audio devices receive the audio data, they extract the audio content of their respective channels by using their own decoding and processing capabilities and perform the audio playback according to the preset playback parameters.

Step 308, for second audio devices in the BLE Auracast™ group, packing the synchronized audio data into BLE packets compatible for BLE transmission.

In the embodiments of this application, the synchronized audio data is segmented, where each data segment includes audio information of a fixed length of time, header information is added to each data segment in a manner of complying with a data format and a bandwidth limitation of BLE transmission, each data segment and the corresponding header information are encoded and compressed, and data segments are packed as the BLE packets.

The synchronized audio data stream is segmented, and each data segment includes audio information of a preset and fixed length of time. Furthermore, header information is generated for each data segment, and the header information includes such key metadata as a start timestamp of the audio segment, a device it belongs to, a channel number it belongs to, and a description of the format of the audio data, etc. The header information is added so as to ensure the identifiability and accuracy of the data segment in the BLE transmission process. In order to comply with the BLE data transmission format and limited bandwidth, encoding and compression processes are performed on each data segment and its header information. The encoding process usually involves converting one format of the audio data to another one which is more suitable for wireless transmission, and the compression process aims to reduce the size of the data, so as to improve the transmission efficiency and reduce the latency. The encoded and compressed data segments and their header information are packed into BLE packets, which have a particular structure and format, including data length, type identification, and actual data content, etc.

By segmenting the synchronized audio data and adding header information to the data segments, followed by encoding, compressing, and packing the data segments into BLE packets, the transmission efficiency and compatibility of the audio data are effectively improved. This ensures stable transmission of data in the BLE network, reduces bandwidth consumption, and optimizes the smoothness and quality of audio playback.

Step 309, transmitting, according to the configured audio distribution network, the BLE packets sequentially or in parallel to the second audio devices using the BLE technology, and enabling each second audio device to decode and extract audio data of each channel for playback.

In the embodiments of this application, a topological structure of the configured audio distribution network is read, a connection relationship and transmission sequence among the second audio devices are determined according to the topological structure, and a target configuration of the audio distribution network is obtained. Next, a target BLE transmission strategy is selected according to the target configuration of the audio distribution network, and the BLE data packets are transmitted sequentially or in parallel to the second audio devices.

The topological structure of the audio distribution network defines the connection manner and layout of the audio devices. Possible topological structures include a point-to-point structure, a star-shaped structure, a ring-shaped structure, or a tree-shaped structure, each having its specific application scenarios. For example, the point-to-point structure is applied to a scenario where the quantity of devices is small, and the star-shaped structure facilitates centralized management and control.

The physical or logical connections between the audio devices are specified according to the topological structure, and the specific transmission path and sequence of the target audio data from the source device to each terminal device are determined, so as to ensure that each audio device can receive and process its own target audio data according to a predetermined way, thereby to obtain both efficient and accurate target configuration of the audio distribution network.

Based on the target configuration, the appropriate target BLE transmission strategy is selected for the distribution of BLE packets. When selecting the target BLE transmission strategy, it considers the type of each device, the quantity of devices, and transmission requirements. For example, for a network with a large quantity of audio devices, a parallel transmission strategy may be used to improve transmission efficiency. For devices that are located at large distances, an enhanced BLE transmission strategy may be needed to ensure stable data transmission.

By reading the topological structure of the audio distribution network, specifying the connections and transmission sequences among the audio devices, it forms an efficient and accurate target configuration. This allows for the flexible selection of BLE transmission strategies, enabling sending the data packets sequentially or in parallel, significantly enhancing the efficiency and stability of audio data distribution, and ensuring that each second audio device can timely and accurately receive the required audio information.

In the embodiments of this application, target audio data including multi-channel information is obtained, and intelligent hybrid transmission architecture connections among audio devices corresponding to a plurality of rooms are established using WiFi technology and combining with a BLE Auracast™ protocol. Next, distribution paths of the target audio data are dynamically configured according to intelligent distance detection results, and a configured audio distribution network is obtained. The clock differences and network delays among the audio devices are identified and obtained, a time compensation value of each audio device is calculated using the synchronization algorithm in the BLE Auracast™ protocol based on the clock differences and network delays, and time compensation information is obtained. Time compensation is performed on data of each channel of the target audio data based on the time compensation information, and the synchronized audio data is obtained. For first audio devices in the WiFi group, the synchronized audio data is transmitted to each first audio device according to the configured audio distribution network via WiFi, and each first audio device is enabled to receive and extract audio data of each channel for playback. For second audio devices in the BLE Auracast™ group, the synchronized audio data is packed into BLE packets compatible for BLE transmission, the BLE packets are sequentially or in parallel transmitted to the second audio devices according to the configured audio distribution network using the BLE technology, and each second audio device is enabled to decode and extract audio data of each channel for playback. This embodiment dynamically configures the audio distribution path based on the distance of the audio devices by integrating WiFi and BLE Auracast™ protocol, and accurately compensates for clock differences and network delays using BLE synchronization algorithms. This achieves efficient and synchronous audio data transmission for multi-room audio systems. Whether transmitted via WiFi or BLE, each audio device can accurately receive and play audio data corresponding to its respective channel, greatly enhancing the synchronization and quality of multi-room audio playback.

The above describes the method of audio processing combining WiFi and Bluetooth Low Energy BLE technologies in the embodiments of this application, and the following description illustrates an apparatus of audio processing combining WiFi and Bluetooth Low Energy BLE technologies in the embodiments of this application. Please refer to FIG. 4, the apparatus of audio processing combining WiFi and Bluetooth Low Energy BLE technologies according to the embodiments of this application includes:

an obtaining module 401, configured to obtain target audio data including multi-channel information;

an establishing module 402, configured to establish, using WiFi technology and combining with a BLE Auracast™ protocol, intelligent hybrid transmission architecture connections among audio devices corresponding to a plurality of rooms;

a configuring module 403, configured to dynamically configure distribution paths of the target audio data according to intelligent distance detection results, and obtain a configured audio distribution network;

an adjusting module 404, configured to adjust, using a synchronization algorithm in the BLE Auracast™ protocol, a timing sequence of the target audio data, and obtain synchronized audio data; and a playback module 405, configured to transmit, according to the configured audio distribution network, the synchronized audio data via WiFi or the BLE Auracast™ protocol to a corresponding channel of each audio device for playback.

In the embodiments of this application, the high-efficiency data transmission capability of WiFi technology is utilized to overcome the insufficient operational range of BLE technology, while the synchronization algorithm of the BLE Auracast™ protocol is employed to effectively reduce delay in multi-channel audio synchronization. Thereby, high-efficient, stable, and synchronous transmission of audio data between multi-room audio devices is achieved, significantly enhancing audio playback coordination and user experience.

Figure 5:
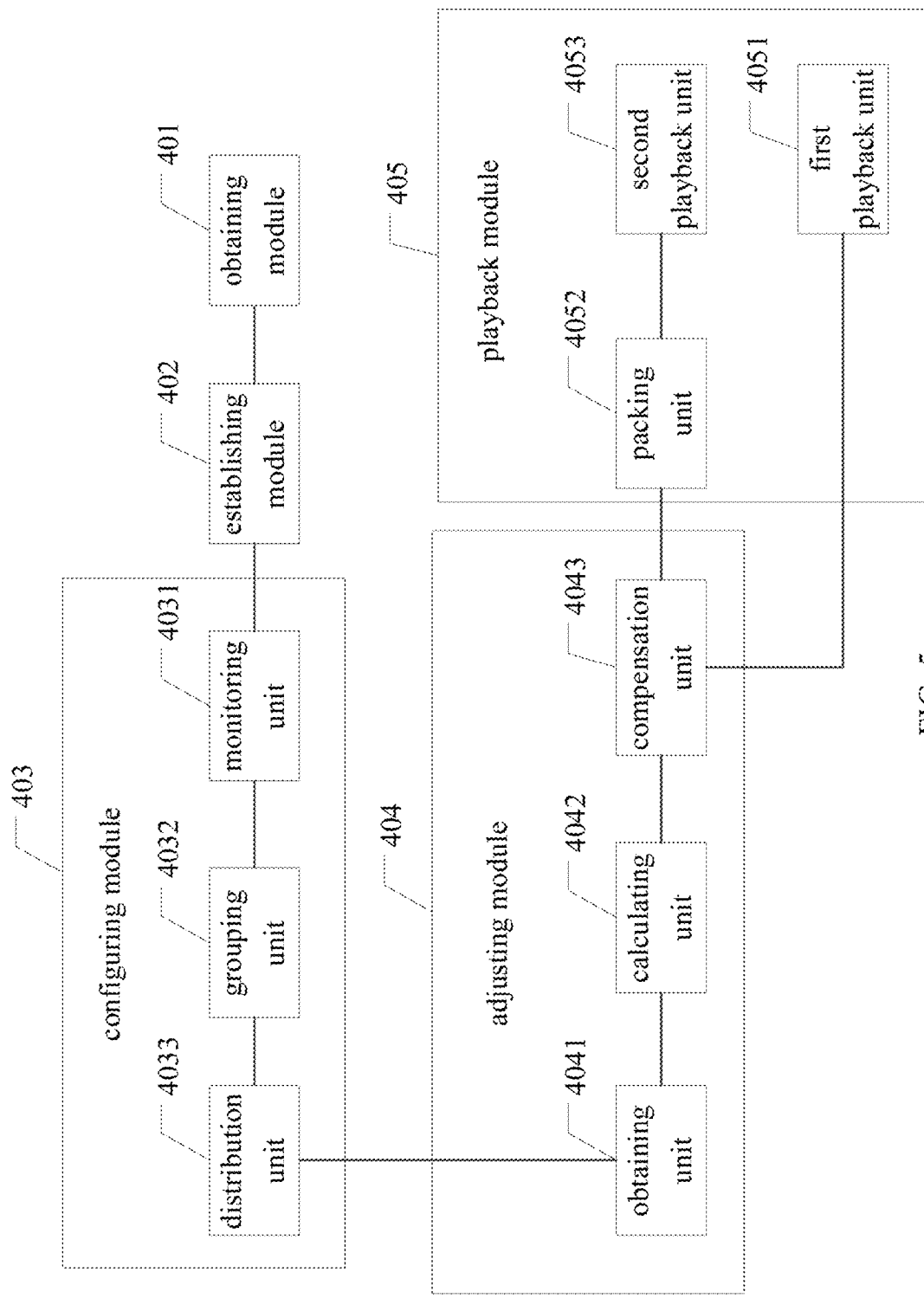
FIG. 5 is another schematic diagram of the apparatus of audio processing combining WiFi and BLE technologies according to the embodiments of this application.

Please refer to FIG. 5, the apparatus of audio processing combining WiFi and Bluetooth Low Energy BLE technologies according to the embodiments of this application includes:

an obtaining module 401, configured to obtain target audio data including multi-channel information;

an establishing module 402, configured to establish, using WiFi technology and combining with a BLE Auracast™ protocol, intelligent hybrid transmission architecture connections among audio devices corresponding to a plurality of rooms;

a configuring module 403, configured to dynamically configure distribution paths of the target audio data according to intelligent distance detection results, and obtain a configured audio distribution network;

an adjusting module 404, configured to adjust, using a synchronization algorithm in the BLE Auracast™ protocol, a timing sequence of the target audio data, and obtain synchronized audio data; and a playback module 405, configured to transmit, according to the configured audio distribution network, the synchronized audio data via WiFi or the BLE Auracast™ protocol to a corresponding channel of each audio device for playback.

Optionally, the obtaining module 401 may be specifically configured to:

receive original audio data, where the original audio data includes information of at least two channels;

analyze the original audio data, identify and separate data of each channel; and pre-process, according to a preset audio processing rule, the separated data of each channel, and obtain the target audio data including multi-channel information.

Optionally, the establishing module 402 may be specifically configured to:

buffer, using the WiFi technology, the target audio data including the multi-channel information;

activate a BLE broadcast function and setting a corresponding broadcast parameter through the BLE Auracast™ protocol; and scan, using BLE technology, the audio devices of rooms, identifying a BLE identifier of each audio device to establish a communication connection, and form the intelligent hybrid transmission architecture connections.

Optionally, the configuring module 403 includes:

a monitoring unit 4031, configured to monitor in real time a relative distance between each audio device and a WiFi access point, and obtain distance information;

a grouping unit 4032, configured to group all audio devices according to the distance information; and a distribution unit 4033, configured to configure a corresponding transmission manner for each audio device based on a grouping result, determine the distribution paths of the target audio data and obtain the configured audio distribution network.

Optionally, the grouping unit 4032 may be specifically configured to:

compare the relative distance of each audio device from the WiFi access point with a preset grouping threshold; and categorize, according to comparison results, all audio devices into a WiFi transmission group and a BLE Auracast™ protocol transmission group.

Optionally, the distribution unit 4033 may be specifically configured to:

configure the corresponding transmission manner for each audio device based on the grouping result;

determine the distribution paths of the target audio data based on a transmission manner configuration result in combination with layout of each room, performance of each audio device and a quantity of channels of the target audio data; and set a role of each audio device in the audio distribution network based on the determined distribution paths, and verifying whether a configuration is successful, and obtaining the configured audio distribution network.

Optionally, the adjusting module 404 includes:

an obtaining unit 4041, configured to identify and obtain a clock difference and network delay between the audio devices;

a calculating unit 4042, configured to calculate, using the synchronization algorithm in the BLE Auracast™ protocol based on the clock difference and network delay, a time compensation value of each audio device, and obtain time compensation information; and a compensation unit 4043, configured to perform, based on the time compensation information, time compensation on data of each channel of the target audio data, and obtain the synchronized audio data.

Optionally, the obtaining unit 4041 may be specifically configured to:
  activate a clock synchronization mechanism, transmit and receive a clock synchronization signal via a BLE connection, measure a signal round-trip time, and calculate the network delays between the audio devices; and
  record, using a timestamp, time when each audio device receives the synchronization signal, and calculate the clock difference between the audio devices.

Optionally, the calculating unit 4042 may be specifically configured to:
  select one audio device as a primary device and remaining audio devices as secondary devices;
  calculate, based on the clock difference and network delay collected by the primary device, a time offset of each secondary device with respect to the primary device, and obtain time offset information; and
  calculate, based on the time offset information and a playback rate of an audio data stream corresponding to each audio device, a time compensation value of each secondary device, and obtain time compensation information.

Optionally, the playback module 405 includes:
  a first playback unit 4051, configured to, for first audio devices in the WiFi group, transmit the synchronized audio data according to the configured audio distribution network via WiFi, and enable each first audio device to receive and extract audio data of each channel for playback;
  a packing unit 4052, configured to, for second audio devices in the BLE Auracast™ group, pack the synchronized audio data into BLE packets compatible for BLE transmission; and
  a second playback unit 4053, configured to transmit, according to the configured audio distribution network, the BLE packets sequentially or in parallel to the second audio devices using the BLE technology, and enable each second audio device to decode and extract audio data of each channel for playback.

Optionally, the packing unit 4052 may be specifically configured to:
  segment the synchronized audio data, where each data segment includes audio information of a fixed length of time; and
  add header information to each data segment in a manner of complying with a data format and a bandwidth limitation of BLE transmission, encode and compress each data segment and the corresponding header information, and pack data segments as the BLE packets.

Optionally, the second playback unit 4053 may be specifically configured to:
  read a topological structure of the configured audio distribution network;
  determine, according to the topological structure, a connection relationship and transmission sequence among the second audio devices, and obtain a target configuration of the audio distribution network; and
  select, according to the target configuration of the audio distribution network, a target BLE transmission strategy, and transmit the BLE data packets sequentially or in parallel to the second audio devices.

In this embodiment of this application, it establishes a hybrid transmission architecture by integrating WiFi with the BLE Auracast™ protocol, thereby to address the issues of delay of WiFi in multi-channel synchronization and the insufficient operational range of BLE. In addition, it achieves efficient and synchronous audio data distribution, delivering users a more stable, flexible, and high-quality multi-room audio playback experience.

Figure 4:
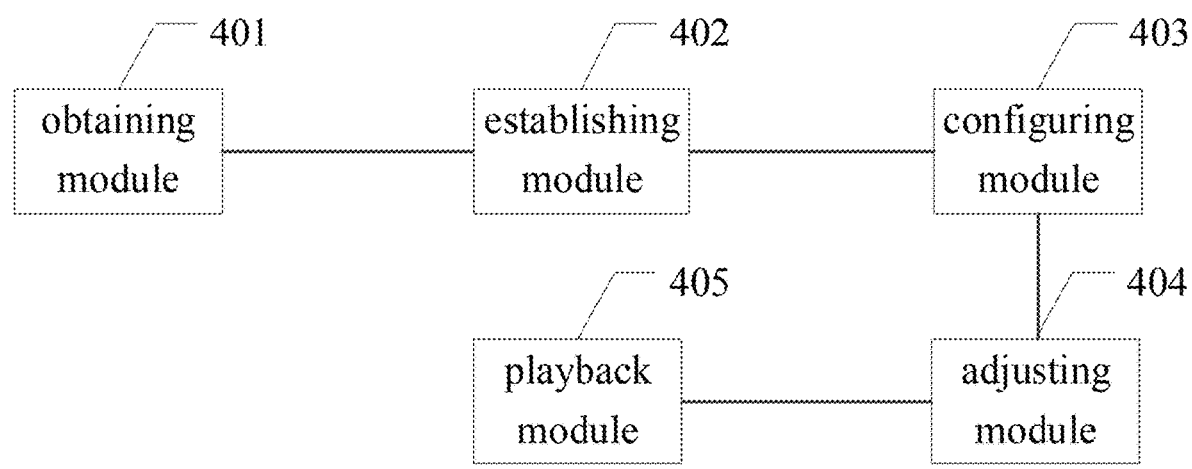
FIG. 4 is a schematic diagram of an apparatus of audio processing combining WiFi and BLE technologies according to the embodiments of this application.

In FIG. 4 and FIG. 5, the apparatus of audio processing combining WiFi and Bluetooth Low Energy BLE technologies in the embodiments of this application is described in detail in the form of modular functional entities. A device of audio processing combining WiFi and Bluetooth Low Energy BLE technologies in the embodiments of this application will be described hereinafter in the form of hardware processing.

Figure 6:
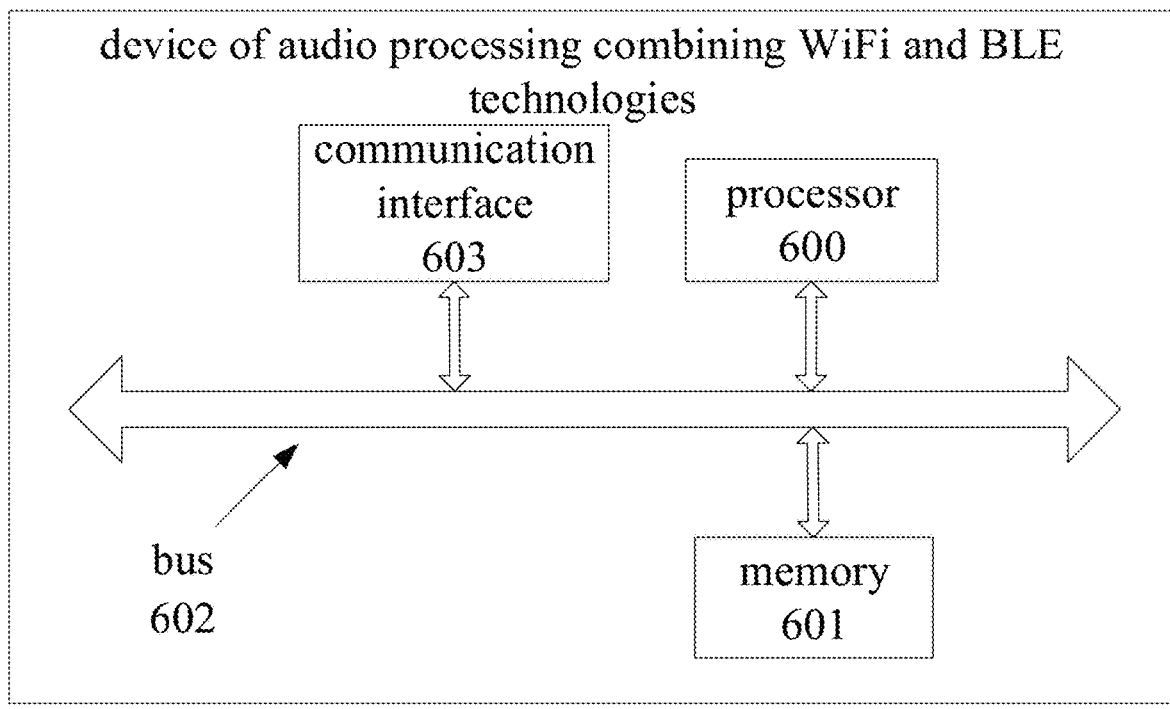
FIG. 6 is a schematic diagram of a device of audio processing combining WiFi and BLE technologies according to the embodiments of this application.

As shown in FIG. 6, the device of audio processing combining WiFi and BLE technologies includes a processor 600 and a memory 601. The memory 601 stores machine executable instructions that can be executed by the processor 600, the machine executable instructions, when executed by the processor 600, cause the processor 600 to implement the above method of audio processing combining WiFi and BLE technologies.

Furthermore, the device of audio processing combining WiFi and BLE technologies in FIG. 6 further includes a bus 602 and a communication interface 603, and the processor 600, the communication interface 603 and the memory 601 are connected via the bus 602.

The memory 601 may include a high-speed random access memory (RAM), or a non-volatile memory (non-volatile memory), for example, at least one disk storage. The communication connection between the system network element and at least one other network element is realized through at least one communication interface 503 (which may be wired or wireless), and the Internet, wide area network, local area network, metropolitan area network, etc. may be used. The bus 602 may be an Industry Standard Architecture (ISA) bus, a Peripheral Component Interconnect (PCI) bus, or an Extended Industry Standard Architecture (EISA) bus, etc. The bus may be categorized as an address bus, a data bus, a control bus, etc. For ease of representation, only one bidirectional arrow is used in FIG. 6, but it does not mean that there is only one bus or one type of bus.

The processor 600 may be an integrated circuit with signal processing capability. In the implementation process, the various steps of the above method may be implemented by an integrated logic circuit of the processor 600 in hardware form or implemented by instructions in the form of software in the processor 600. The processor 600 may be a general-purpose processor, including a central processing unit (CPU), a network processor (NP), etc. The processor 600 may also be a digital signal processor (DSP), an application specific integrated circuit (ASIC), a field programmable gate array (FPGA) or any other programmable logic device, discrete gate or transistor logic device, discrete hardware component. Various methods, steps and logic block diagrams in the embodiments of this application may be implemented or carried out. The general processor may be a micro-processor or any conventional processor, etc. The steps of the method in the embodiments of this application may be directly implemented by a hardware decoding processor, or implemented by a combination of hardware and software modules in the decoding processor. The software modules may be located in a storage medium well-known in the art, such as a random access memory, a flash memory, a read-only memory, a programmable read-only memory, or an electrically erasable programmable memory, a register. The storage medium is located in the memory 601, and the processor 600 reads the information in the memory 601 and finishes the method steps of the above-mentioned embodiment in combination with its hardware.

This application further provides a device of audio processing combining WiFi and BLE technologies, where a computer device includes a memory and a processor. The memory has stored thereon computer-readable instructions, which, when executed by the processor, cause the processor to perform the steps of the method of audio processing combining WiFi and BLE technologies in the above embodiments.

This application further provides a computer-readable storage medium, which may be a non-volatile computer-readable storage medium or a volatile computer-readable storage medium. The computer-readable storage medium may be a volatile computer-readable storage medium having stored thereon instructions, the instructions, when executed on a computer, cause the computer to implement the steps of the above-mentioned method of audio processing combining WiFi and BLE technologies.

Those skilled in the art may clearly understand that, for the sake of convenience and brevity of description, the specific working process of the system, apparatus and units mentioned above can refer to the corresponding processes in the method embodiments, which are not repeated herein.

If the integrated unit is implemented in the form of software functional units and sold or used as an independent product, it may be stored in a computer readable storage medium. Based on this understanding, essence of the technical solutions of this application, or the part contributing to the prior art, or all or part of the technical solutions, may be embodied in the form of a software product. The computer software product is stored in a storage medium, and includes a number of instructions to enable a computer device (which may be a personal computer, a server, or a network device, etc.) to perform all or part of the steps of method described in the various embodiments of this application. The storage medium includes a USB flash disk, a mobile hard disk, a read-only memory (Read-Only Memory, ROM), a random access memory (Random Access Memory, RAM), a magnetic disk, an optical disk, or other medium which can store program code.

The above embodiments are only used to illustrate the technical solutions of this application, but shall not be construed as limiting this application. As can be appreciated by a person skilled in the art, although this application has been described in detail with reference to the foregoing embodiments, any modifications or variations of the technical solutions in the aforementioned embodiments, or equivalent replacements of part of the technical features within the scope of the disclosed technology, may still be made by those skilled in the art. These modifications or replacements do not make the essence of the corresponding technical solutions depart from the spirit and scope of the technical solutions of the embodiments of this application.

What is claimed is:

1. A method of audio processing combining a wireless fidelity (WiFi) technology and a bluetooth low energy (BLE) technology, comprising:
   obtaining target audio data comprising multi-channel information;
   establishing, using the WiFi technology and combining with a BLE Auracast™ protocol, intelligent hybrid transmission architecture connections among audio devices corresponding to a plurality of rooms;
   dynamically configuring distribution paths of the target audio data according to intelligent distance detection results, and obtaining a configured audio distribution network;
   adjusting, using a synchronization algorithm in the BLE Auracast™ protocol, a timing sequence of the target audio data, and obtaining synchronized audio data; and
   transmitting, according to the configured audio distribution network, the synchronized audio data via the WiFi technology or the BLE Auracast™ protocol to a corresponding channel of each of the audio devices for playback;
   wherein establishing, using the WiFi technology and combining with the BLE Auracast™ protocol, the intelligent hybrid transmission architecture connections among the audio devices corresponding to the plurality of rooms comprises:
      buffering, using the WiFi technology, the target audio data comprising the multi-channel information;
      activating a BLE broadcast function and setting a corresponding broadcast parameter through the BLE Auracast™ protocol; and
      scanning, using the BLE technology, the audio devices of the plurality of rooms, identifying a BLE identifier of each of the audio devices to establish a communication connection, and forming the intelligent hybrid transmission architecture connections;
   wherein dynamically configuring the distribution paths of the target audio data according to the intelligent distance detection results and obtaining the configured audio distribution network comprise:
      monitoring in real time a relative distance between each of the audio devices and a WiFi access point, and obtaining distance information;
      comparing the relative distance of each of the audio devices from the WiFi access point with a preset grouping threshold to obtain comparison results;
      categorizing, according to the comparison results, all the audio devices into a WiFi transmission group and a BLE Auracast™ protocol transmission group; and
      configuring a corresponding transmission manner for each of the audio devices based on a grouping result, determining the distribution paths of the target audio data and obtaining the configured audio distribution network;
   wherein adjusting the timing sequence of the target audio data using the synchronization algorithm in the BLE Auracast™ protocol and obtaining the synchronized audio data comprise:
      identifying and obtaining a clock difference and a network delay between the audio devices;
      selecting one audio device as a primary device and remaining audio devices as secondary devices;
      calculating, based on the clock difference and the network delay collected by the primary device, a time offset of each of the secondary devices with respect to the primary device, and obtaining time offset information;
      calculating, based on the time offset information and a playback rate of an audio data stream corresponding to each of the audio devices, a time compensation value of each of the secondary devices, and obtaining time compensation information; and
      performing, based on the time compensation information, a time compensation on data of each channel of the target audio data, and obtaining the synchronized audio data.

2. The method of audio processing combining the WiFi technology and the BLE technology according to claim 1, wherein obtaining the target audio data comprising the multi-channel information comprises:
  receiving original audio data, wherein the original audio data comprises information of at least two channels;
  analyzing the original audio data, and identifying and separating data of each of the at least two channels to obtain separated data of each of the at least two channels; and
  pre-processing, according to a preset audio processing rule, the separated data of each of the at least two channels, and obtaining the target audio data comprising the multi-channel information.

3. The method of audio processing combining the WiFi technology and the BLE technology according to claim 1, wherein configuring the corresponding transmission manner for each of the audio devices based on the grouping result, determining the distribution paths of the target audio data and obtaining the configured audio distribution network comprise:
  configuring the corresponding transmission manner for each of the audio devices based on the grouping result to obtain a transmission manner configuration result;
  determining the distribution paths of the target audio data based on the transmission manner configuration result in combination with a layout of each of the plurality of rooms, a performance of each of the audio devices and a quantity of channels of the target audio data; and
  setting a role of each of the audio devices in an audio distribution network based on the distribution paths, and verifying whether a configuration is successful, and obtaining the configured audio distribution network.

4. The method of audio processing combining the WiFi technology and the BLE technology according to claim 1, wherein identifying and obtaining the clock difference and the network delay between the audio devices comprises:
  activating a clock synchronization mechanism, transmitting and receiving a clock synchronization signal via a BLE connection, measuring a signal round-trip time, and calculating the network delay between the audio devices; and
  recording, using a timestamp, time when each of the audio devices receives the clock synchronization signal, and calculating the clock difference between the audio devices.

5. The method of audio processing combining the WiFi technology and the BLE technology according to claim 1, wherein transmitting, based on the configured audio distribution network, the synchronized audio data via the WiFi technology or the BLE Auracast™ protocol to the corresponding channel of each of the audio devices for playback comprises:
  for first audio devices in the WiFi transmission group, transmitting the synchronized audio data according to the configured audio distribution network via the WiFi technology to each of the first audio devices, and enabling each of the first audio devices to receive and extract audio data of each channel for playback;
  for second audio devices in the BLE Auracast™ protocol transmission group, packing the synchronized audio data into BLE packets compatible for BLE transmission; and
  transmitting, according to the configured audio distribution network, the BLE packets sequentially or in parallel to the second audio devices using the BLE technology and enabling each of the second audio devices to decode and extract audio data of each channel for playback.

6. The method of audio processing combining the WiFi technology and the BLE technology according to claim 5, wherein packing the synchronized audio data into the BLE packets compatible for the BLE transmission comprises:
  segmenting the synchronized audio data to obtain data segments, wherein each of the data segments comprises audio information of a fixed length of time; and
  adding header information to each of the data segments in a manner of complying with a data format and a bandwidth limitation of the BLE transmission, encoding and compressing each of the data segments and the corresponding header information to obtain encoded and compressed data segments, and packing the encoded and compressed data segments as the BLE packets.

7. The method of audio processing combining the WiFi technology and the BLE technology according to claim 5, wherein transmitting, according to the configured audio distribution network, the BLE packets sequentially or in parallel to the second audio devices using the BLE technology and enabling each of the second audio devices to decode and extract the audio data of each channel for playback comprise:
  reading a topological structure of the configured audio distribution network;
  determining, according to the topological structure, a connection relationship and a transmission sequence among the audio devices, and obtaining a target configuration of the audio distribution network; and
  selecting, according to the target configuration of the audio distribution network, a target BLE transmission strategy, transmitting the BLE packets sequentially or in parallel to the second audio devices, and enabling each of the second audio devices to decode the BLE packets, and extract the audio data of each channel for playback.

8. A device of audio processing combining a WiFi technology and a BLE technology, comprising: a memory and at least one processor, wherein the memory stores instructions; the at least one processor calls the instructions in the memory to allow the device to perform the method of audio processing combining the WiFi technology and the BLE technology according to claim 1.

9. A non-transitory computer-readable storage medium, storing instructions, wherein the instructions implement, when executed by a processor, the method of audio processing combining the WiFi technology and the BLE technology according to claim 1.

10. An apparatus of audio processing combining a WiFi technology and a BLE technology, comprising:
  an obtaining module, configured to obtain target audio data comprising multi-channel information;
  an establishing module, configured to establish, using the WiFi technology and combining with a BLE Auracast™ protocol, intelligent hybrid transmission architecture connections among audio devices corresponding to a plurality of rooms;
  a configuring module, configured to dynamically configure distribution paths of the target audio data according to intelligent distance detection results, and obtain a configured audio distribution network;
  an adjusting module, configured to adjust, using a synchronization algorithm in the BLE Auracast™ protocol, a timing sequence of the target audio data, and obtain synchronized audio data; and a playback module, configured to transmit, according to the configured audio distribution network, the synchronized audio data via the WiFi technology or the BLE Auracast™ protocol to a corresponding channel of each of the audio devices for playback;

wherein the establishing module is further configured to:
  buffer, using the WiFi technology, the target audio data comprising the multi-channel information;
  activate a BLE broadcast function and set a corresponding broadcast parameter through the BLE Auracast™ protocol; and
  scan, using the BLE technology, the audio devices of the plurality of rooms, identify a BLE identifier of each of the audio devices to establish a communication connection, and form the intelligent hybrid transmission architecture connections;

wherein the configuring module is further configured to:
  monitor in real time a relative distance between each of the audio devices and a WiFi access point, and obtain distance information;
  compare the relative distance of each of the audio devices from the WiFi access point with a preset grouping threshold to obtain comparison results;
  categorize, according to the comparison results, all the audio devices into a WiFi transmission group and a BLE Auracast™ protocol transmission group; and
  configure a corresponding transmission manner for each of the audio devices based on a grouping result, determine the distribution paths of the target audio data and obtain the configured audio distribution network;

wherein the adjusting module is further configured to:
  identify and obtain a clock difference and a network delay between the audio devices;
  select one audio device as a primary device and remaining audio devices as secondary devices;
  calculate, based on the clock difference and the network delay collected by the primary device, a time offset of each of the secondary devices with respect to the primary device, and obtain time offset information;
  calculate, based on the time offset information and a playback rate of an audio data stream corresponding to each of the audio devices, a time compensation value of each of the secondary devices, and obtain time compensation information; and
  perform, based on the time compensation information, a time compensation on data of each channel of the target audio data, and obtain the synchronized audio data.

* * * * *